July 21, 1936.   S. S. LEAF ET AL   2,048,011
WAFER MACHINE
Filed Oct. 29, 1934   3 Sheets-Sheet 1

Inventors:
Sol S. Leaf
Regolo Panza
By Williams, Bradbury, McCaul & Hinkle
Attys.

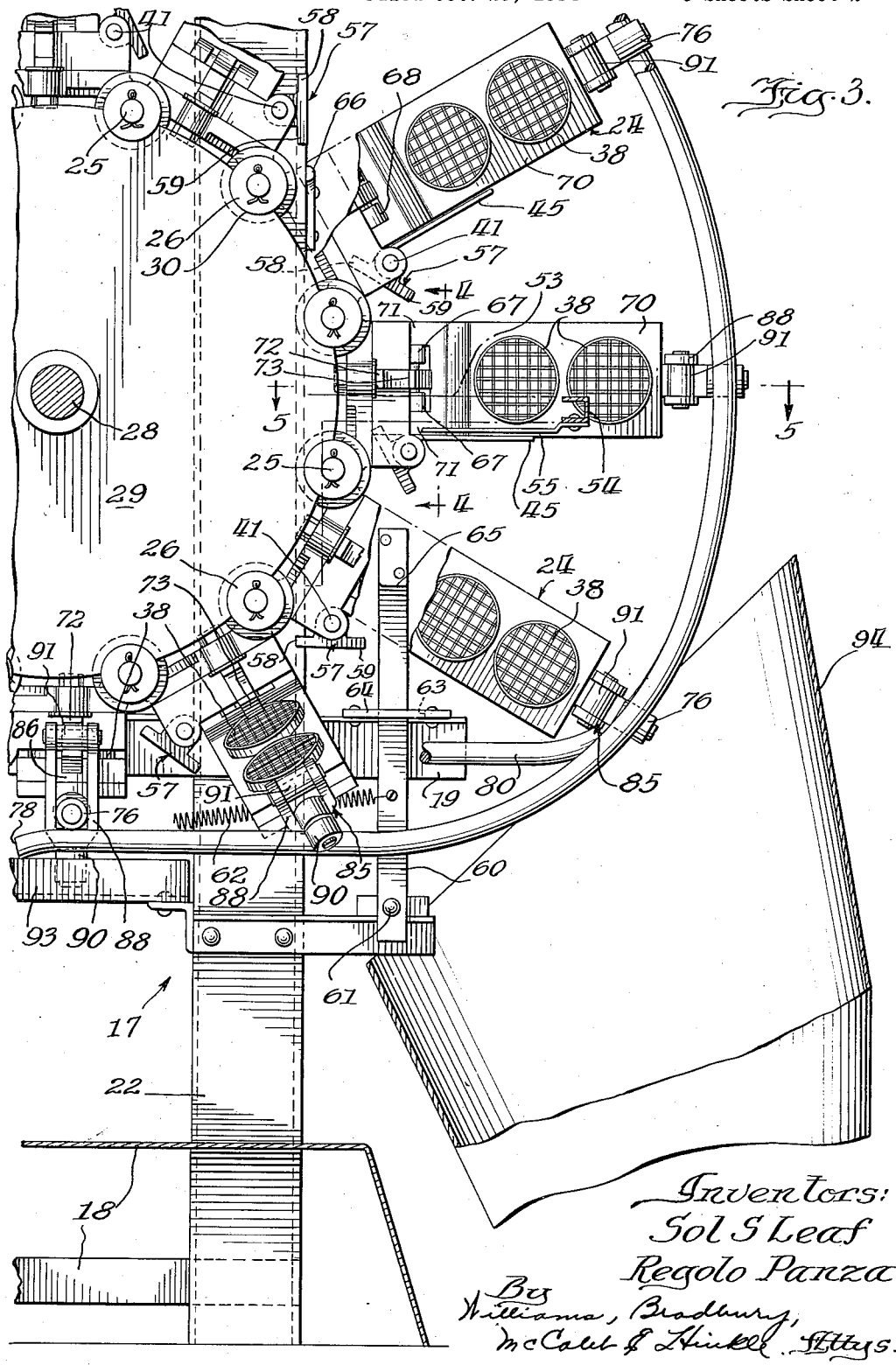

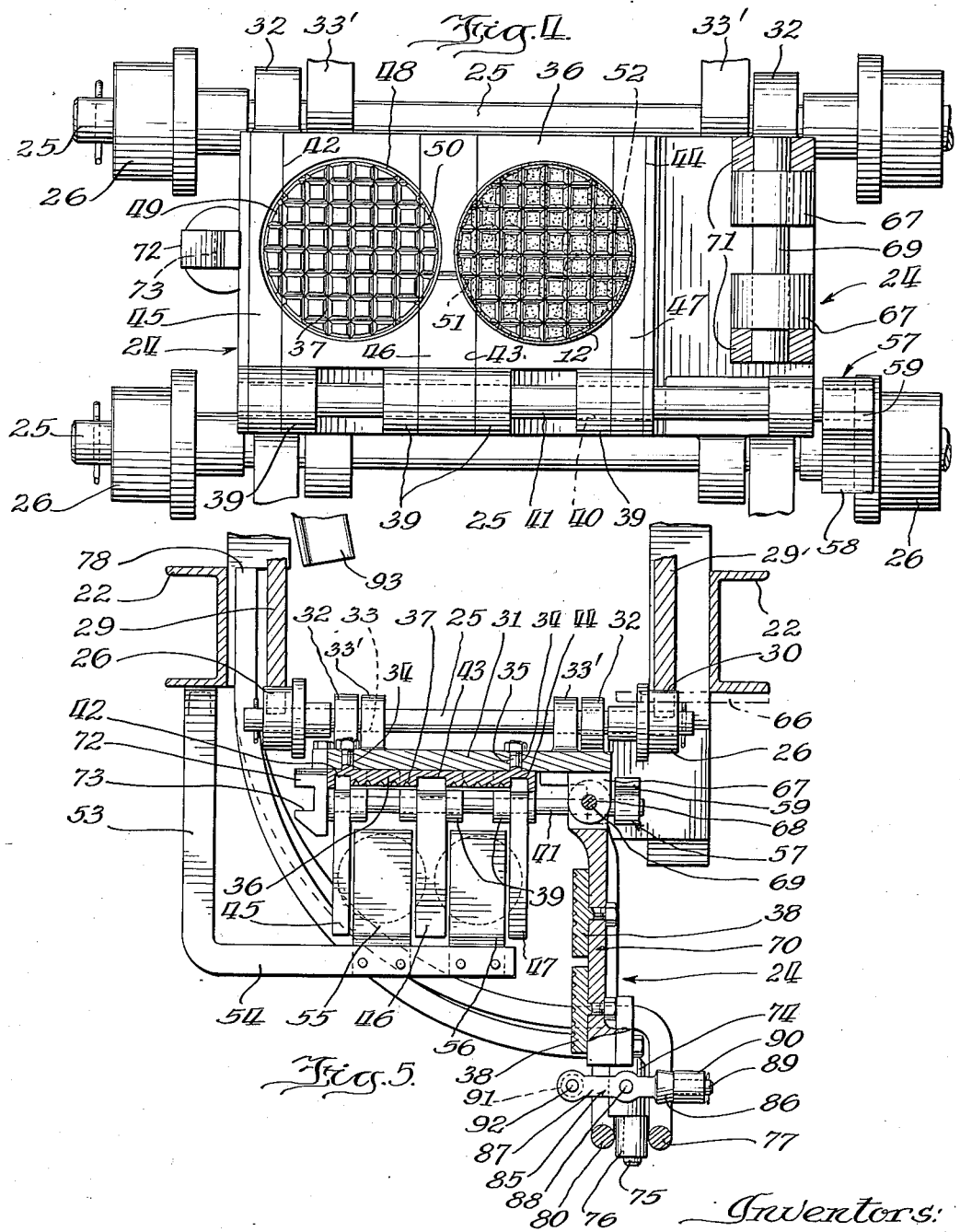

Patented July 21, 1936

2,048,011

UNITED STATES PATENT OFFICE 2,048,011

WAFER MACHINE

Sol S. Leaf and Regolo Panza, Chicago, Ill., assignors to Overland Candy Corporation, Chicago, Ill., a corporation of Illinois Application October 29, 1934, Serial No. 750,451

2 Claims. (Cl. 107—58)

The present invention relates to a wafer machine, and is particularly concerned with machines adapted for the manufacture of wafers of the type utilized for making ice cream sandwiches and frequently called waffles.

The present machines and methods may, however, be utilized for manufacture of all kinds of wafers, and we do not wish to limit ourselves to any particular type of product.

According to the methods of the prior art, wafers of the type illustrated herein were manufactured in large sheets and the circular wafers were then completed by cutting out the circular wafers with substantially circular knives, the material between the respective wafers being wasted.

Furthermore, the methods of the prior art required considerably more handling of the product than the present methods, and the expense was increased by the amount of waste pastry and the multiplicity of operations required in the manufacture of the wafers.

One of the objects of the present invention is the provision of an automatic machine adapted to manufacture circular wafers of the class described.

Another object of the invention is the provision of improved methods of manufacture and manipulation of the wafers, by means of which the wafers may be manufactured at a lower cost and in greater volume in the same space over the methods of the prior art.

Another object of the invention is the provision of improved extracting mechanism for removing wafers of the class described from the molds without damaging the wafers and for permitting the continuous and automatic operation of the machinery for making wafers.

Other objects and advantages of the invention will be apparent from the following description and accompanying drawings, in which similar characters of reference indicate similar parts throughout the several views.

Referring to the drawings, of which there are three sheets,

Fig. 3 is a fragmentary side elevational view of one end of the machine showing the molding and wafer extracting mechanism;

Figures 1, 2:
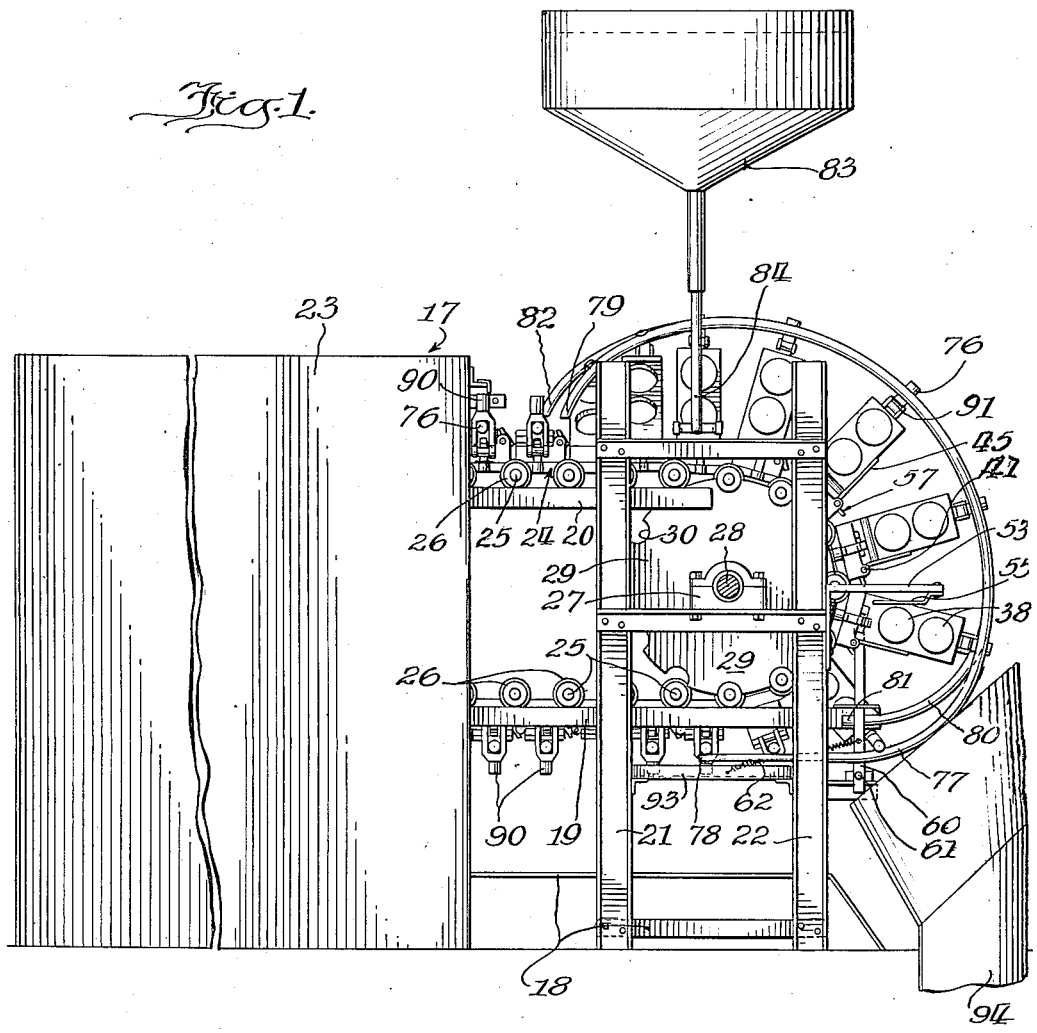
Fig. 1 is a side elevational view of a wafer baking machine constructed according to the present invention.
Fig. 2 is a transverse sectional view of a wafer of the type turned out by the foregoing machine.

Fig. 4 is a top plan view of one-half of one of the mold units showing the details of the mold and wafter extracting mechanism with parts of the mechanism in section taken on the plane of the line 4—4 of Fig. 3; and Fig. 5 is a fragmentary sectional view taken on the plane of the line 5—5 of Fig. 3 showing details of construction of the two molds which make up one mold unit and the accompanying extracting mechanism.

Referring now to Fig. 2 and to Fig. 4, Fig. 2 is the sectional view of the wafer made by the present machine, and the right hand illustration in Fig. 4 shows the plan view of one side of the wafer. The present wafers are circular in form, as shown in Fig. 4, but might obviously be made of any geometrical shape and the circular form is merely exemplary of one type of wafer.

Referring to Fig. 2, the present wafers are preferably provided at the edge on the top and bottom with a peripherally extending upwardly projecting rib 10 and a downwardly projecting rib 11 on the wafer 12. The wafer is also preferably provided with the transversely extending ribs 13 on top intersected by the other ribs 14 at right angles thereto, and on the bottom it is provided with ribs 15 and 16 at right angles to each other.

The ribs 13, 14 are preferably staggered with respect to the ribs 15, 16, thereby greatly increasing the strength of the wafer and for the purpose of causing the wafer to stick to one of the halves of the mold we prefer to make the ribs on one side of the wafer higher, that is, the depressions in the mold are deeper and, therefore, they tend to retain the wafer on that half of the mold.

Referring to Fig. 1, the wafer machine, which is indicated in its entirety by the numeral 17, is provided with suitable longitudinally extending frame members 18, 19, 20, and suitable vertically extending frame members 21, 22 for supporting and guiding the elements of machinery. The machine is also provided with a suitable housing 23, which encloses the major portion of the mechanism, and the machine is provided with an oven or baking means within the housing 23 for baking the wafers after the molds have been filled. The molds are filled at the right end of Fig. 1 and progress toward the left in Fig. 1 at the top, and as the molds come out of the oven at the bottom of Fig. 1 progressing toward the right, the wafers are done.

The frame members 19 and 20 comprise guides for movably supporting an endless chain which is made up of a plurality of mold units 24, each of the mold units being provided with a pivotal connection to two adjacent mold units by means of the shafts 25 which are equipped with rollers 26. At the right hand end of the machine the frame work is provided with a pair of bearings 27 for rotatably supporting the shaft 28, which bears a pair of sprocket wheels 29 having circular grooves 30 regularly spaced about their peripheries for receiving the rollers 26.

The sprocket wheels 29 are driven by any suitable driving mechanism, such as an electric motor and suitable reducing gearing, and the sprocket wheels 29 constitute the driving means for the endless chain of mold units 24.

Referring to Fig. 4, this is a view showing in plan one of the halves of the mold unit 24 with certain other parts in section. For example, each mold unit comprises a supporting plate 31 having a pair of bearing lugs 32 projecting therefrom at each end, the lugs having bores 33 for receiving the shafts 25. The lugs 32 at one end are offset with respect to the lugs 33' at the opposite end of the supporting plate 31 in order that the lugs may not interfere with each other when two lugs of one plate and two lugs of another plate are located on the shaft 25.

The supporting plate 31 is provided with a plurality of transverse bores 34 for receiving the cylindrical threaded lugs 35 which are carried by the mold member 36. The mold member 36 may thus be fixedly secured to the supporting plate 31, and it is provided with suitable grooves 37 extending at right angles to each other to make the wafers of the configuration shown in Fig. 2. The grooves in the mold member 36 are deeper than the grooves in the opposite mold member 38, so that the wafer will stick to the mold member 36.

It should be noted that while the present mold unit is adapted to make two wafers, the mold units might be made for single wafers or for any suitable number of wafers. At one end the mold member 36 is provided with the upwardly projecting bearing lugs 39, each lug having a cylindrical bore 40 for receiving the shaft 41. The mold 36 is provided with grooves 42, 43, 44, each groove being substantially rectangular in section as shown in Fig. 5, and extending across the mold member 36, as shown in Fig. 4. The grooves 42—44 are adapted to be filled by the metallic strips 45, 46, 47, which are substantially rectangular in section and complementary in shape to the grooves and which are movably mounted with respect to the mold member 36 by means of the shaft 41 with which the strips 45—47 rotate.

Strips 45, 46 and 47 are of such width and so located and the grooves 42—44 are so located that they intersect a part of the wafer forms 48 on the mold member 36 and, therefore, the upper surfaces of the strips 45—47 bear the molded formations 49, 50, 51, 52, which form a part of the wafer 12.

In other words, the strips 45—47 constitute extractors for extracting the wafers from the mold, and they are movable parts of the mold located directly under the wafer or between the wafer and the mold at the points 49—52.

When the wafer has been baked and is still adhering to the mold member 36, it may be removed by rotary movement of the shaft 41, which lifts the extractors 45—47 from the mold member 36 and separates the wafer from the mold. In order to make sure that the wafers will not adhere to the extractors 45—47, which also form a part of the mold, the framework is preferably provided with a supporting arm 53 having a part 54 which extends over adjacent the ends of the extractors 45—47, and the arm portion 54 is provided with the inwardly projecting plates 55, 56, of sufficient area to substantially fill the space between the extractors 45—47 and to strike the wafers as the extractors move past the plates 55, 56 to separate the wafers from the extractors.

The shaft 41 is provided at its end with a camming member 57 having camming formations 58, 59 extending in opposite directions from the shaft 41. The framework also supports a lever 60 which is pivotally mounted at 61 and urged to the left in Fig. 3 by a spring 62. The limits of movement of the lever 60 are determined by a slot 63 located in a stop member 64 carried by the frame member 19 and adjacent its upper end. Lever 60 carries a lug or plate 65 for engaging the end 59 of camming member 57.

Referring to Fig. 3, as the endless chain comprising the mold units 24 progresses upward in Fig. 3, the end 59 of camming member 57, which is now below the lug 65, engages the lug 65 and rotates the shaft 41 in a clockwise direction, this causes the extractors 45—47, shown in plan Fig. 4, to lift upward in Fig. 4 or to rotate downward in Fig. 5, and the extractors lift the wafer from the mold member 36. The lever 60 being spring pressed, and the end 59 of the cam member 57 being disposed diagonally with respect to the direction of movement of the cam 57 toward the lug 65, the lug 65 slides off the end 59, the spring 62 permitting the lever 60 to move toward the right and the cam member 57 passes lug 65 after it has actuated the extractors 45—47.

The framework 18—22 of the machine also supports a plate or lug 66, as shown in Fig. 3, in the path of the end 58 of cam 57, and when the mold unit 24 has progressed to a point where the cam 57 strikes lug 66 the extractors 45—47 are rotated in a counterclockwise direction by the engagement of end 58 with plate 66. The arrangement in this case is such that the end 58 passes over the plate 66 when the extractors have been moved back into the grooves 42—44 of mold member 36, and the cam member 57 is left in the position shown at the top of Fig. 3 after it has passed plate 66.

It will thus be observed that the extractors 45—47 are automatically actuated to eject the wafers from the mold member 36 as the mold units progress about the right end of the machine.

Each mold unit 24 has its supporting plate 31 provided at the right hand end in Figs. 4 and 5 with the upwardly projecting bearing lugs 67 having the circular bores 68 for receiving the shaft 69. Shaft 69 rotatably supports the mold supporting plate 70 by means of its bearing lugs 71. The mold supporting plate 70 is provided on the side which is toward the mold member 36 with the mold members 38 which may consist of the separate circular mold members, each provided with the transverse grooves for the purpose of forming the ribs 13, 14 on the top of the wafer 12.

The supporting member 31 also supports at its left end, Fig. 5, a latching member 72 comprising a downwardly extending metallic member provided with a groove 73, the lower wall of which constitutes a retaining surface.

The supporting plate 70 is provided at its lower end, Fig. 5, with a downwardly projecting lug 74 having its end 75 provided with a roller 76. The roller 76 is adapted to engage above a curved guide member 77, Fig. 1, which extends from the point 78 at the bottom of the right hand end of the machine to the point 75

79 at the top of the right hand end of the machine. A second guide member 80 extends from the point 81 to the point 82.

The two guide members 77 and 80 are so curved that when the mold units 24 pass up around the sprocket 29 at the right end of the machine, the roller 76 is guided between the members 77 and 80 in such a manner that mold supporting member 70 is pivoted downward in Fig. 1, or outward toward the right from mold supporting member 31, thereby separating the molds, as shown in Fig. 1. The guides continue to the points 79 and 82 where they bring the two halves of the mold again into engagement with each other after the mold has been filled with a suitable supply of batter.

Referring to Fig. 1, 83 indicates in its entirety a suitable device for supplying batter to the mold member 36 as the mold member progresses along the guide 20. This batter supplying means 83 may be of any convenient type and is preferably provided with a step by step motion so that the discharge spout 84 progresses with the mold while the batter is flowing.

The lug 74, Fig. 5, is provided with a pivotally mounted latching member 85, which comprises a stirrup formed with a yoke 86 having a pair of legs 87 pivotally mounted on the pin 88. At the right hand end of Fig. 5 of the latching member 85, it is provided with a trunnion 89 having a roller 90, and at the left hand end, Fig. 5, the two legs 87 carry a roller 91 by means of pin 92. The roller 91 is adapted to engage in the groove 73, Fig. 5, to lock the two halves of the mold in closed position, and the mold units, which are seen at the bottom of Fig. 1, are in such position.

The framework is provided with a camming member 93, a fragment of which is shown at the top of Fig. 5, which extends downward and toward the right in Fig. 5, or horizontally and diagonally into the plane of the paper in Fig. 1, for the purpose of camming the rollers 90 in a counter-clockwise direction to remove the rollers 91 successively from the grooves 73 of the latching member 72, to unlock the molds as they reach the right end of the machine. Thus the camming member 93 unlocks the molds before they reach the guides 77 and 80, and after reaching the guides 77 and 80 the movement of the mold member 70 is controlled by engagement of the roller 76 between the guides 77 and 80.

A similar camming member at the top of the machine, engages the roller 90 and again locks the molds after they have been filled with batter, as shown at the top left of Fig. 1. The molds are then carried into the baking oven, which is enclosed within the housing 23, and when they again emerge at the bottom of Fig. 1, the wafers are baked.

The machine is provided with a suitable container 94, which is located to receive the wafers as they are discharged from the molds, and the wafers may be gathered and packed by hand or by suitable machinery.

The present method of making and handling wafers comprises the separation of a pair of mold members, the filling of one of the mold members with a suitable charge of batter, bringing the molds into juxtaposition with one another, baking the batter in the mold, separating the mold members, retaining the wafer on one of the mold members by means of enlarged surface formations on the wafer, lifting or extracting the wafer from the latter mold member by moving a portion of the mold member away from the major part of the mold member to lift the wafer, and again filling the mold and repeating the cycle.

It will thus be observed that the present mechanism is adapted to operate automatically to make the ribbed wafers of circular form without the necessity for cutting out the wafers from large sheets of ribbed material and without the waste which was caused by the prior art. The extracting mechanism operates automatically without any substantial amount of breakage, and the machine may be operated continuously to turn out the wafers in greater volume than could be done in the same amount of space with the machine of the prior art.

While we have illustrated and described a preferred embodiment of our invention, many modifications may be made without departing from the spirit of the invention, and we do not wish to be limited to the precise details described but desire to avail ourselves of all changes within the scope of the appended claims.

What we claim as new and desire to secure by Letters Patent of the United States is:

1. In a wafer machine the combination of a supporting framework with guides for movably supporting an endless chain of mould units, each of said mould units comprising a pair of mould halves and one of said mould halves being movably mounted with respect to the other mould half, means for separating said mould halves at a predetermined point in the travel of said endless chain, and means comprising a metal member provided with molding formations forming a continuation of the pattern of said mold actuated thereafter for separating a wafer from one of said mould halves, said latter mould half being provided with moulding formations adapted to retain the wafer on said latter mould half instead of the other mould half.

2. In a wafer machine the combination with a supporting framework of guides for movably supporting an endless chain of mould units, each of said mould units comprising half moulds pivoted end to end and another half mould movably mounted with respect to each of the first mentioned half moulds, one of said half moulds having a metallic part movably mounted in the surface of the mould and adapted to be actuated to separate a wafer from said latter half mould, said movably mounted half moulds being provided with members for engaging guides, guides suitably shaped and located on said framework for engaging said latter members and separating said half moulds as said endless chain progresses to discharge the wafers, said metal members being each mounted on a shaft on each of the first mentioned half moulds, and camming means carried by said shaft and adapted to be actuated by engagement with a part on the framework to lift said metal member from its mould when a predetermined point in the travel of the chain is reached, said framework having another engaging part for engaging said camming means to return said metal member into the surface of said mould after the wafer has been discharged.

SOL S. LEAF.
REGOLO PANZA.